(12) United States Patent
de Baat et al.

(10) Patent No.: US 7,320,395 B2
(45) Date of Patent: Jan. 22, 2008

(54) FLOOR FOR CARGO SPACE

(75) Inventors: Marius Cornelis de Baat, Bergschenhoek (NL); Frans Arian Heino de Raad, Coevorden (NL); Niek Mater, Coevorden (NL)

(73) Assignee: Cargo Floor B.V., Coevorden (NL)

( * ) Notice: Subject to any disclaimer, the term of this patent is extended or adjusted under 35 U.S.C. 154(b) by 28 days.

(21) Appl. No.: 11/366,990

(22) Filed: Mar. 2, 2006

(65) Prior Publication Data

US 2006/0207863 A1    Sep. 21, 2006

(30) Foreign Application Priority Data

Mar. 2, 2005   (NL)   .................................... 1028439

(51) Int. Cl.
    *B65G 25/04*   (2006.01)
(52) U.S. Cl. ................................................. 198/750.5
(58) Field of Classification Search ............. 198/750.5, 198/750.7
    See application file for complete search history.

(56) References Cited

U.S. PATENT DOCUMENTS

| | | | | |
|---|---|---|---|---|
| 4,823,938 A | * | 4/1989 | Foster | 198/750.4 |
| 5,125,502 A | * | 6/1992 | Foster | 198/750.3 |
| 5,165,524 A | * | 11/1992 | Foster | 198/750.4 |
| 5,222,590 A | * | 6/1993 | Quaeck | 198/750.5 |
| 5,402,878 A | | 4/1995 | Lutz | |
| 5,957,267 A | * | 9/1999 | Quaeck et al. | 198/750.5 |
| 6,006,896 A | * | 12/1999 | Foster | 198/750.5 |
| 6,056,113 A | * | 5/2000 | Foster | 198/750.5 |
| 6,513,648 B1 | * | 2/2003 | Hallstrom et al. | 198/750.4 |

FOREIGN PATENT DOCUMENTS

| | | |
|---|---|---|
| DE | 100 46 054 | 4/2002 |
| EP | 1 443 003 | 8/2004 |

* cited by examiner

*Primary Examiner*—James R. Bidwell
(74) *Attorney, Agent, or Firm*—Ladas and Parry LLP

(57) ABSTRACT

A cargo supporting floor has two or more groups of movable slats attached to drive feet which drive cylinder assemblies reciprocate. The drive cylinder assemblies are at least partially in front of the groups of slats, the slats being attached to the upper sides of the drive feet with movable components at least partially below the upper surfaces of the slats, the movable components being above the lower surfaces of the slats and/or above the upper surfaces of the drive feet.

23 Claims, 13 Drawing Sheets

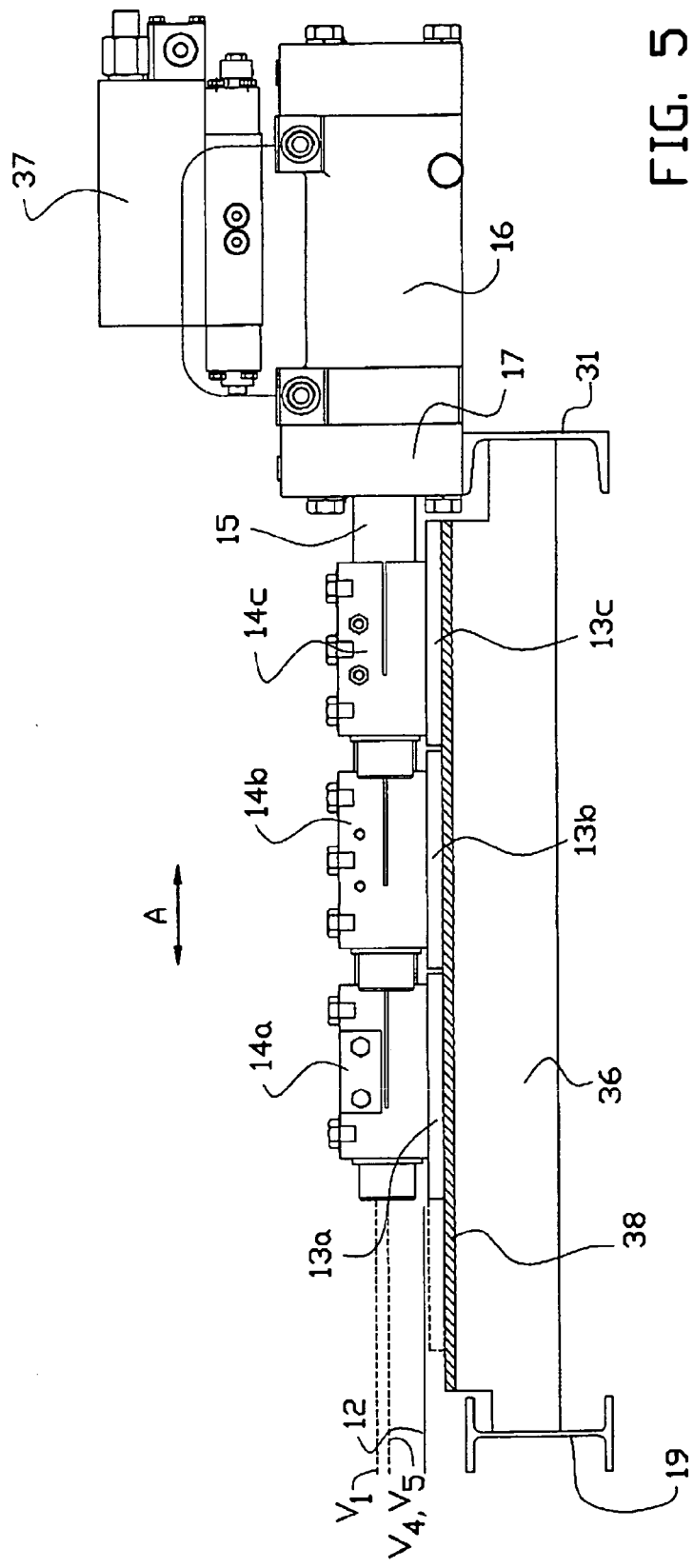
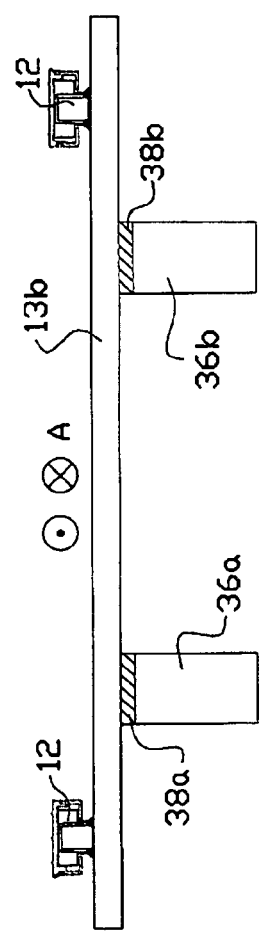
FIG. 5
FIG. 5A

FLOOR FOR CARGO SPACE

BACKGROUND OF THE INVENTION

The invention relates to a floor for supporting and transporting cargo, wherein the floor comprises two or more groups of slats, which are reciprocal in the slat direction. The invention also relates to a cargo space which comprises such a floor.

Such floors are known, for instance as a floor of a trailer. The slats can be attached groupwise to drive feet, which are each connected to a movable component of a drive cylinder, the piston rod or the cylinder housing. By activating the cylinders the drive feet and thereby the groups of slats are reciprocated so as to to displace the load over the floor, in the slat direction. In a first type of embodiment drive feet and drive cylinders are incorporated in a drive assembly, which is located below the floor, for instance attached to the main beams of a chassis. According to a second type of embodiment the drive feet and drive cylinders are located at the front of the cargo space. According to a first further embodiment thereof the drive feet are also located in front of the slats and connected to the respective slats by means of fingers which extend horizontally from the drive feet. This arrangement is complex and occupies more space in the slat direction. In a second further embodiment the slats are attached directly to the lower side of the drive feet. In the second embodiments the slats extend through a bulkhead of the cargo space, the entire drive being located in front of the bulkhead. The surface of the slat portions located there, as well as the further space in front of the bulkhead, cannot be used for loading purposes.

It is an object of the invention to provide a floor of the type mentioned in the introductory paragraph with which, using a drive which is arranged at the end of the floor, an arrangement can be realized which is compact in the horizontal slat direction.

It is an object of the invention to provide a floor of the type mentioned in the introductory paragraph with which, using a drive which is arranged at the end of the floor, a vertically compact arrangement can be realized.

It is an object of the invention to provide a floor of the type mentioned in the introductory paragraph with which, using a drive which is arranged at the end of the floor, a large useful loading area can be maintained.

SUMMARY OF THE INVENTION

According to one aspect the invention provides a floor for supporting cargo, wherein the floor comprises two or more groups of movable slats, which extend between a front side and a rear side of the floor, each group of movable slats being attached to a drive foot which is reciprocal in the slat direction by means of an accompanying drive cylinder assembly with a cylinder and piston rod, the drive cylinder assemblies being at least partially arranged in front of the groups of slats, and by means of the movable component of the respective drive cylinder assembly are each connected to an associated drive foot, wherein the slats are attached to the upper side of the drive foot. Thus a vertically compact arrangement can be realized. Moreover a larger surface of the slats at the front of the floor may be available for cargo.

It is remarked that the movable component may be the cylinder itself, but preferably the piston rod or an extension or continuation thereof, whether or not hinged thereto, and whether or not aligned with it.

Preferably, the movable component is located at least partially below the upper surface of the slats, so that the amount of occupied space above the slats can be kept limited.

According to a first further development of this concept the movable component is located above the lower surface of the slats and/or above the upper surface of the drive feet. Then the movable component is preferably at least partially located within the vertical space as defined by the slats. Thus, the movable components are at least partially within the space as defined by the slats, so that the construction height can be kept limited.

In one embodiment the movable component may extend into one of the slats of a group. The movable component may then be parallelly connected to a drive foot and to a slat. One of the slats of a group may be directly connected to the associated movable component. The respective slat may be connected to the associated drive foot by means of the movable component.

In particular in such an embodiment all slats may extend up to the front end of the floor, so that the whole (flat) upper surface of the slats may be available for cargo.

According to an alternative embodiment, the movable component extends into a vertical space which is left clear by local reduction in length of one or more slats. The length of the other slats may remain unaltered.

According to one embodiment, the slats which are located next to the space for movement of the movable components, extend up to the end of the floor at that location.

In order to keep the cargo separated from the movable parts it will suffice to provide a small shield, like a box or a casing, with covers the space for movement of the movable components.

According to a second further development the movable component is located below the upper surface of the slats, so that the entire upper surface of the slats is available for cargo. The movable component may be located entirely below the slats, and/or entirely below drive feet.

According to a further development of a floor according to the invention a first one of the drive feet also serves as direct or indirect support for another drive foot, so that at least for that other drive foot no supporting provisions have to be made on the frame of the floor. This is advantageous in case of loading at the front of a cargo space. The first one of the drive feet may also serve as a direct or indirect support for more than one other drive foot.

According to one embodiment the first drive foot comprises support guides for one or more other drive feet or movable components connected thereto.

According to an alternative arrangement the drive feet are supported on a fixed sliding support, which is arranged on a frame of the floor.

According to a further aspect, the invention provides a mobile cargo space which comprises a floor according to the invention.

According to one embodiment the cargo space is configured as a trailer and comprises a coupling for coupling with a truck, the drive cylinder assemblies being positioned at the front of the cargo space. Here, the drive cylinders are preferably located outside the cargo space, within the admissible radius from the kingpin up to the front of the trailer.

According to a further aspect, the invention provides a cargo space for dry cargo, with a floor which comprises two or more groups of movable slats, which extend between a front side and a rear side of the cargo space, each group of movable slats being attached to a drive foot which is reciprocal in the slat direction by means of an accompanying drive cylinder assembly with a cylinder and piston rod, the drive cylinders assemblies being arranged at the front of the cargo space and by means of the movable component of the respective drive cylinder assembly are each connected to an associated drive foot, the slats being attached to the drive foot. Preferably, the drive cylinders are positioned outside the cargo space, in particular when considered in a horizontal plane.

According to a further aspect, the invention provides a cargo space with a floor which comprises two or more groups of movable slats, each group of movable slats being connected to a drive foot which is reciprocal in the slat direction by means of an accompanying drive cylinder assembly with a cylinder and piston rod, the drive cylinder assemblies being arranged at the front of the cargo space and by means of the movable component of the respective drive cylinder assembly are each connected to an accompanying drive foot, the slats being attached to the drive foot, and a first one of the drive feet also serves as direct or indirect support for another drive foot.

According to another aspect, the invention provides a cargo supporting floor, wherein the floor comprises two or more groups of movable slats, which extend between a front side and a rear side of the floor, each group of movable slats being attached to a drive foot which is reciprocal in the slat direction by means of an accompanying drive cylinder assembly with a cylinder and piston rod, the drive cylinder assemblies by means of the movable component of the respective drive cylinder assembly being each connected to an associated drive foot, wherein, in top view, a slat of the group of slats which are attached to an accompanying drive foot with its centre is aligned with the axis of the movable component. As a result, the structure is made morE simple, wherein, under circumstances, it will be possible to have the drive foot extend towards both sides in a symmetrical manner.

The movable component may be a piston rod or an extension thereof.

The slats may be attached to the upper side of the drive foot.

From another aspect, the invention provides a cargo supporting floor, wherein the floor comprises three groups of movable slats, which extend between a front side and a rear side of the floor, each group of movable slats being attached to a drive foot which is reciprocal in the slat direction by means of an accompanying drive cylinder assembly with a cylinder and piston rod, the drive cylinder assemblies by means of the movable component of the respective drive cylinder assembly being each connected to an associated drive foot, wherein, of a set of three considered in transverse direction consecutive slats two slats are attached to a same drive foot and one to another drive foot, which may be located adjacent said firstmentioned drive foot. This constitutes a deviation from the usual 1-2-3, 1-2-3, arrangement of the slats of consecutive drive feet. As a result, under circumstances, an as much as possible symmetrical load on the drive feet can be realized.

In one embodiment, the set of three slats is arranged at the edge of the floor. In a further embodiment, such a set of three slats is arranged at both edges of the floor.

Wherever possible, the aspects and measures as described and/or shown in the application may also be applied individually. Those individual aspects, may be the subject of divisional patent applications related thereto. This particularly applies to the measures and aspects that have been described in the sub claims.

BRIEF DESCRIPTION OF THE DRAWINGS

The invention will be elucidated on the basis of a number of exemplary embodiments illustrated in the accompanying drawings. The drawings illustrate in:

FIGS. 5 and 5A, a schematic side view and an end view, respectively, of the driving unit, corresponding with that of FIG. 2, with a first type of support for the drive feet;

DETAILED DESCRIPTION OF THE DRAWINGS

Figure 1:
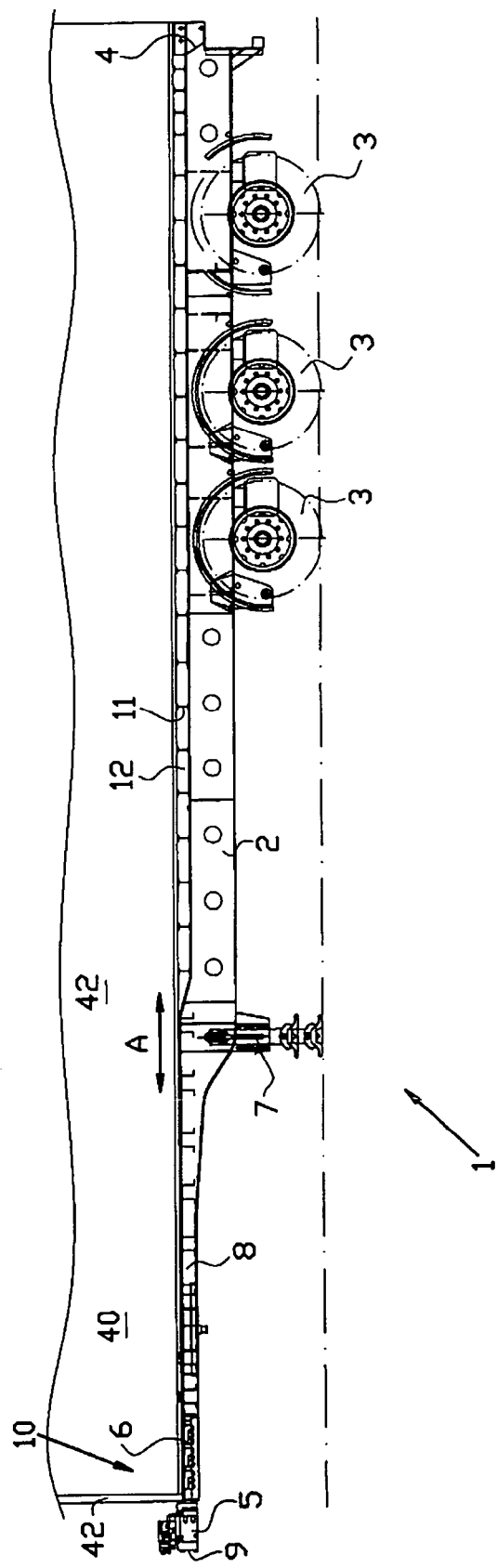
FIG. 1 a side view of a trailer with an exemplary embodiment of a floor according to the invention.

The trailer 1 as shown in FIG. 1 comprises a chassis 2, extending in longitudinal direction, in the drawing from right to left, which is provided with a number of wheels 3 and an extensible front support 7. A floor of slats 12 extends between the rear side 4 and the front side 9 of the trailer 1, said floor being supported on transverse sections 11, the slats 12 being reciprocal in the direction A. For this purpose a driving unit 10 is provided at the front 9, in the tapered front side 8 of the trailer 1, with a driving unit 5 located at the front 9, and a set 6 of drive feet 13a-c, driven by the unit, to which the slats 12 are attached. The chassis 2 comprises a cargo space 40, among other things delimited by front wall 42 and side wall 41a, b.

Figure 2:
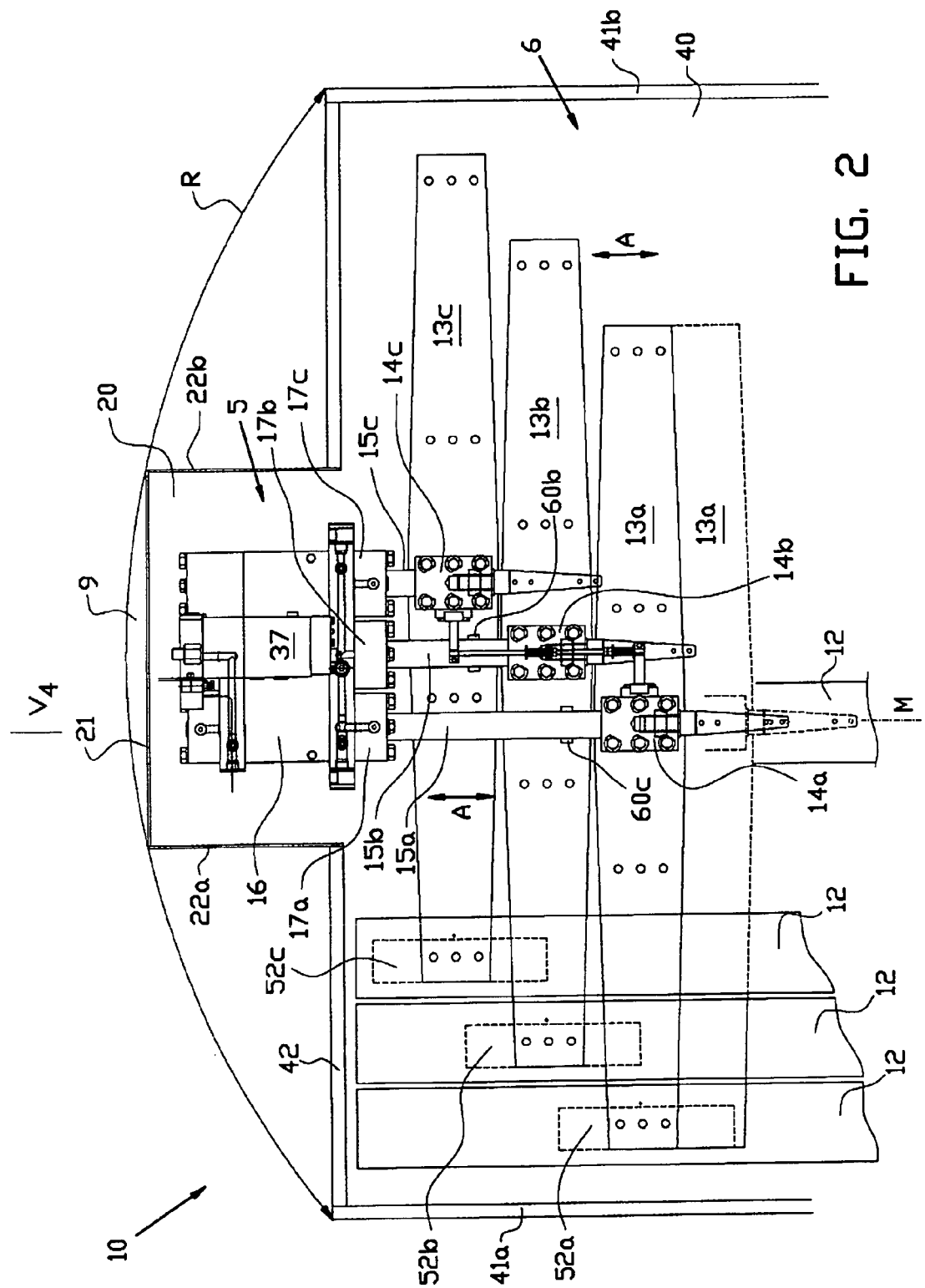
FIG. 2 a schematic top view of the drive section in the floor of the trailer of FIG. 1.

As illustrated in FIG. 2 the slats 12 are divided into three groups, which groups, in this example, are formed by alternately arranged slats 12, wherein, in a manner known per se, both sides of practically each slat 12 of the one group are surrounded by slats of the two other groups.

The slats 12 are attached to the upper side of drive feet 13a, b, c, which extend transversely to the longitudinal direction of the trailer, by means of fingers 52a, b, c, which are attached on top of the drive feet and extend vertically into the slats, and to which the slats are attached by means of for instance bolts, clamps, screws, riveting, popping, welding, adhesion etc. The drive feet 13a, b, c, which are illustrated in their one extreme position as indicated with full lines, are attached to the ends of piston rods 15a, b, c, by means of attachment clamps 14a, b, c. In a manner which is known per se, the attachment clamps 14a-c may comprise two clamp shells which can be tightened relative to each other by means of two bolts, one clamp shell being fixedly connected to the respective drive foot. Other connections between drive feet and piston rod are possible, vide FIG. 4. The piston rods 15a, b, c protrude from cylinders 17a, b, c, which are attached in cylinder block 16. The cylinder block 16 comprises a control block 37, which is controlled by other means, which are not further shown. The associated lines have been left out for ease of survey. The cylinder block 16 can be attached to parts of the frame of the trailer, among other things by means of bolts 51, such as through brackets (not shown) on the cross beam 31. The cylinder block 16 may comprise cross parts which rigidly interconnect the cylinders 17a-c.

The cylinder block 16 is incorporated in a front space 20 located at the front side 9, and which protrudes from the front wall 42 of the cargo space 40. The standard radius R from the kingpin has been indicated schematically. The front wall 21 of the shield 20 lies just within the radius R. The front space 20 is shielded sidewards by means of side walls 22a, 22b which connect to the front wall 42 of the cargo space 40.

In FIG. 2 the other extreme position of the drive foot 13a has been indicated with dashed lines. When the drive foot 13a has been moved to that position, the drive foot 13b can be moved over a similar distance, also in the direction A, to te rear. Subsequently the drive foot 13c can be moved in the same direction, over the same distance. The return movement in forward direction can take place simultaneously for all three drive feet 13a, b, c, and the slats 12 which are connected with the feet are thus also moved back in the direction of the front side 9.

Figure 2A:
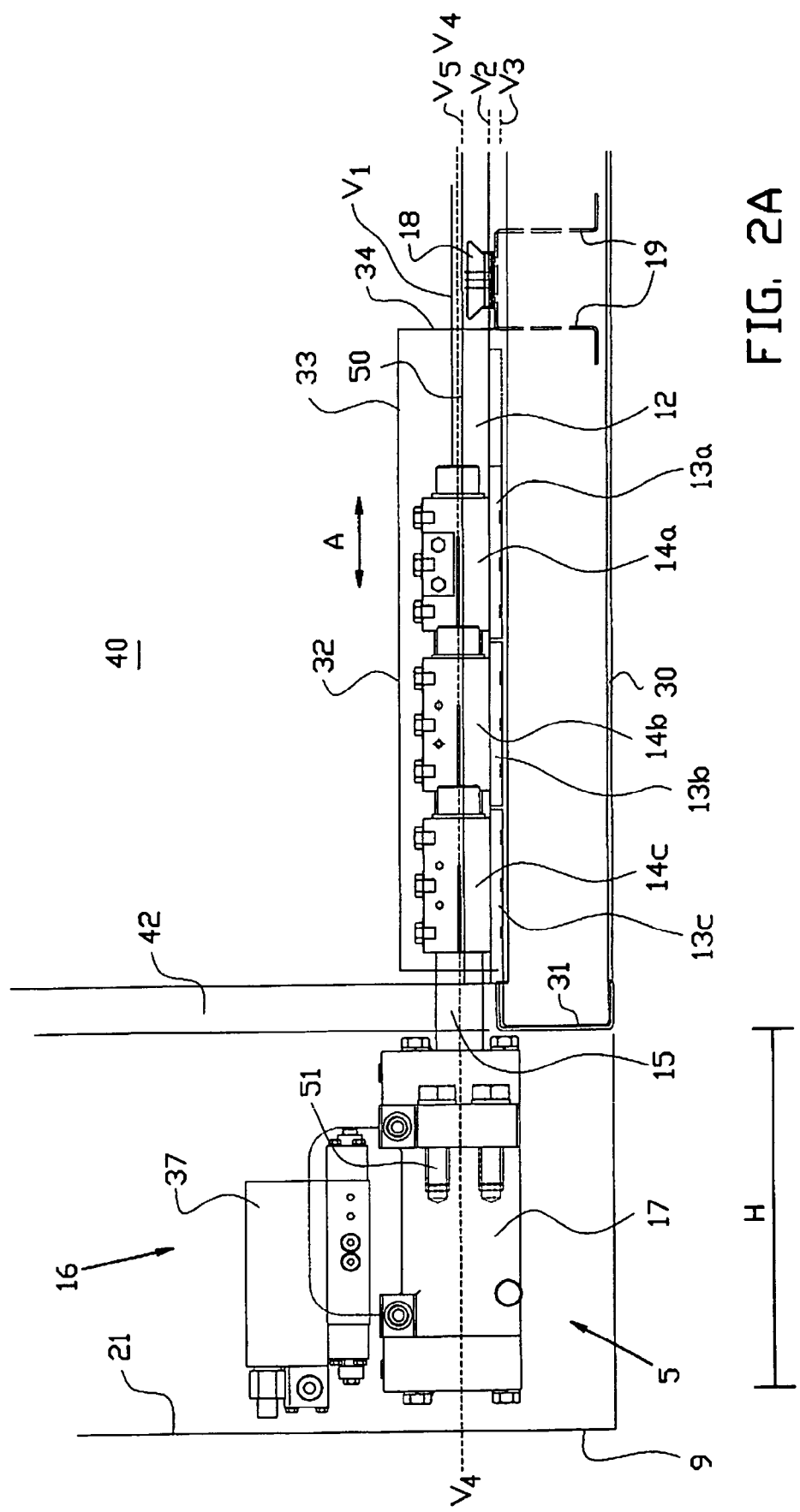
FIGS. 2A and 2B a schematic side view and a schematic rear view, respectively, of the drive section of the floor of the trailer according to FIGS. 1 and 2.
Figure 2B:
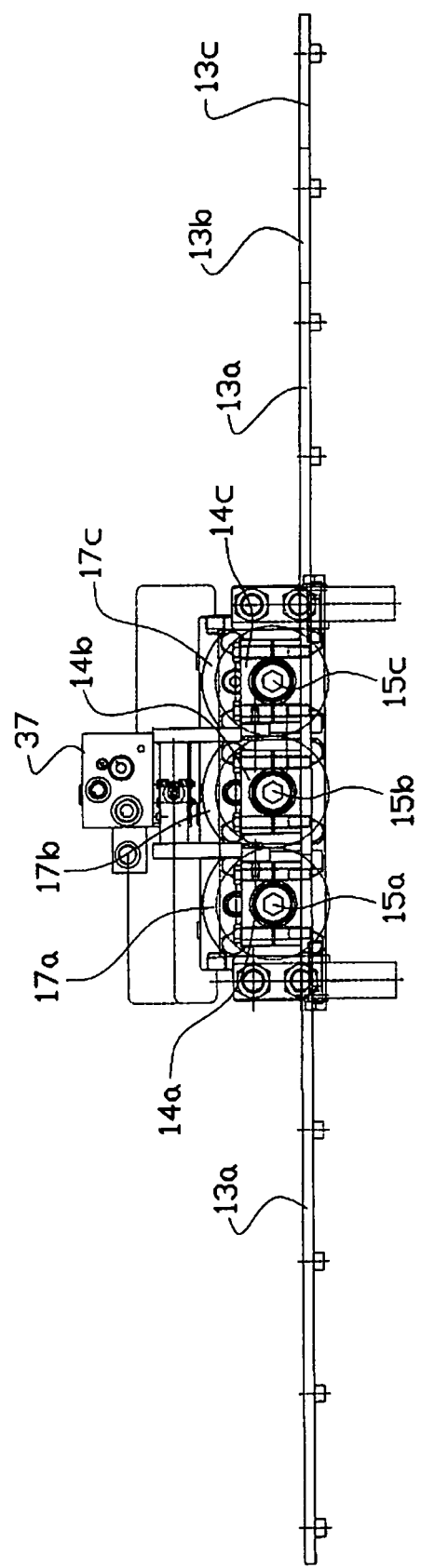

FIGS. 2A and 2B further illustrate the arrangement of FIG. 2 in side view and rear view. The illustration shows that the drive feet 13a, 13b, 13c form the support for the slats 12, which are attached to those drive feet 13a-c by means of the fingers 52a-c. Furthermore cross beams 31 and 19 are illustrated. Slat guides 18 have been provided on cross beam 10, over which guides the slats 12 can reciprocally slide in the direction A in a supported manner. Such cross beams with guides are incorporated in the chassis at regular intervals. The space below the drive feet 13a-c is shielded by sheeting 30.

In FIGS. 2, 2A and 2B the attachment clamps 14a-c are attached to the upper side of the drive feet 13a-c, so that the piston rods 15a-c are also located above the drive feet 13a-c. The piston rods 15a-c and the attachment clamps 14a-c are thus located at least partially within the profile of the slats 12.

In the example of FIG. 2 and further on, the level of the support surface of the slats 12, V1, is illustrated, subsequently the opposite surface of the upper wall of the slats 12, V5, the upper surface of the drive feet 13a-c, V2, subsequently the lower surface of the drive feet V3, and the axis V4 of the piston rods 15a-c which coincides with V5. By this coinciding of V5 and V4 the transfer of forces is substantially enhanced.

It is to be noted that in top view of FIG. 2 the axes V4 of the piston rods are aligned with the middle M of a slat 12.

Figure 2C:
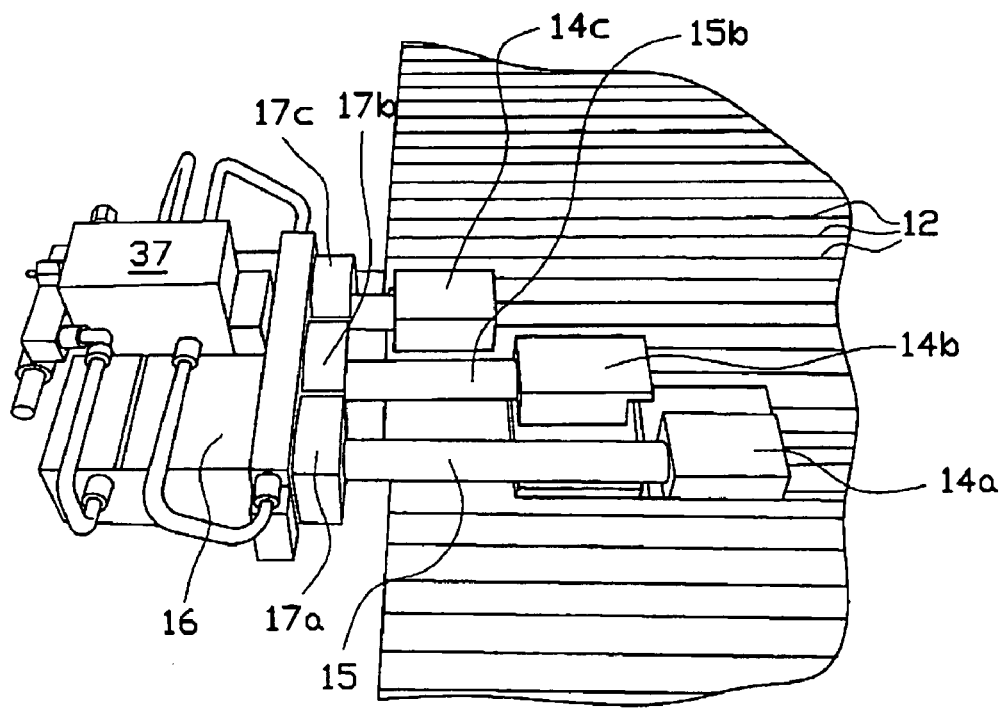
FIGS. 2C and 2D a schematic, oblique top view and an oblique rear view, respectively, of the driving unit of FIG. 2, and showing a slat floor.
Figure 2D:
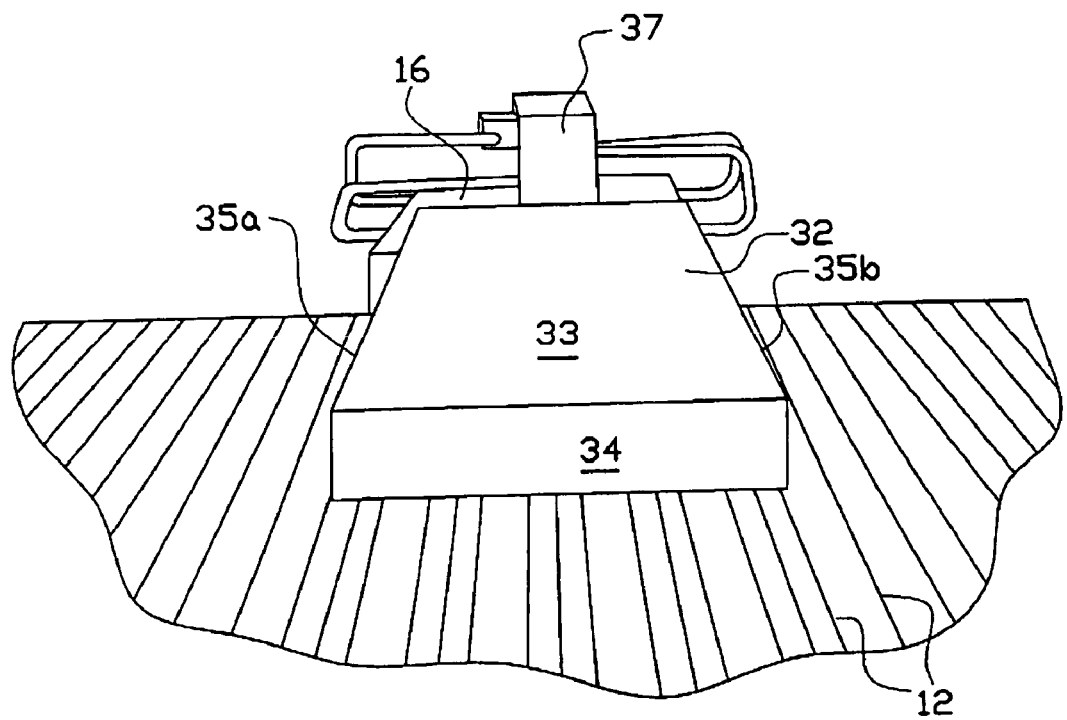

In the illustrated arrangement the cylinder housing 17 extends along a small distance H in front of the front wall 42 of the cargo space 40. The space above most of the slats 12 is completely free in a vertical sense, and is available for cargo. In the area of the attachment clamps 14a-c, it is possible, if necessary, to reduce the length of only the slats which are aligned therewith, as is also shown in FIGS. 2C and 2D, and attached to the clamps/drive feet by means of an additional finger 52a'-c'. There no loading surface is easily available at that location, but at both sides thereof, as is clearly shown in FIGS. 2C, D, laterally thereof. In order to protect the drive and optionally yet facilitate a cargo to be placed above it, it is possible, as illustrated in FIG. 2D, to shield the drive construction at the location of the slats 12, illustrated in FIG. 4A, such as by means of cover 32, with rear wall 34 and side walls 35a, b and with upper wall 33, on which a cargo can be placed.

Figure 3:
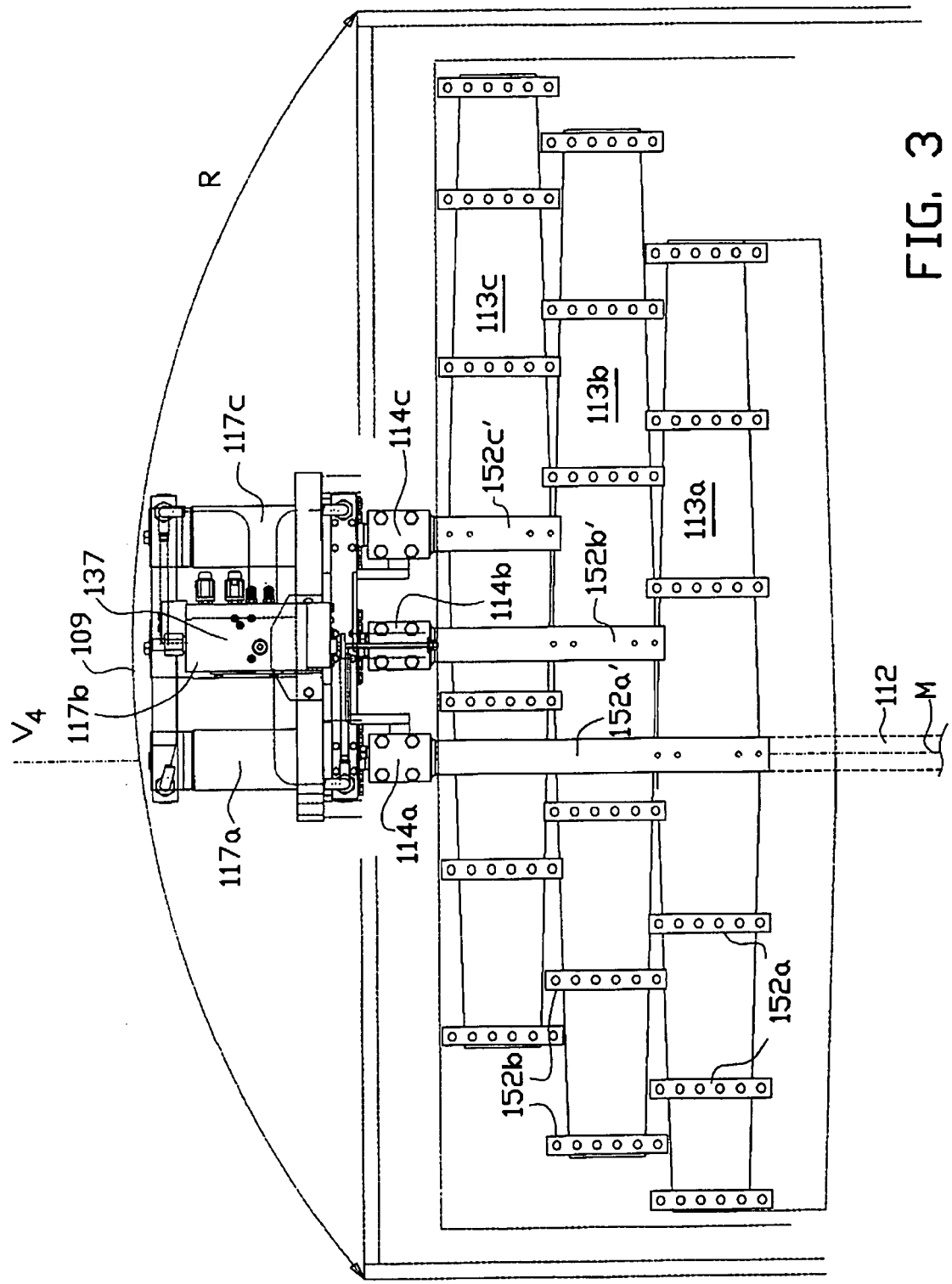
FIG. 3 a schematic top view of an alternative embodiment of the drive section in the floor of the trailer of FIG. 1.
Figure 3A:
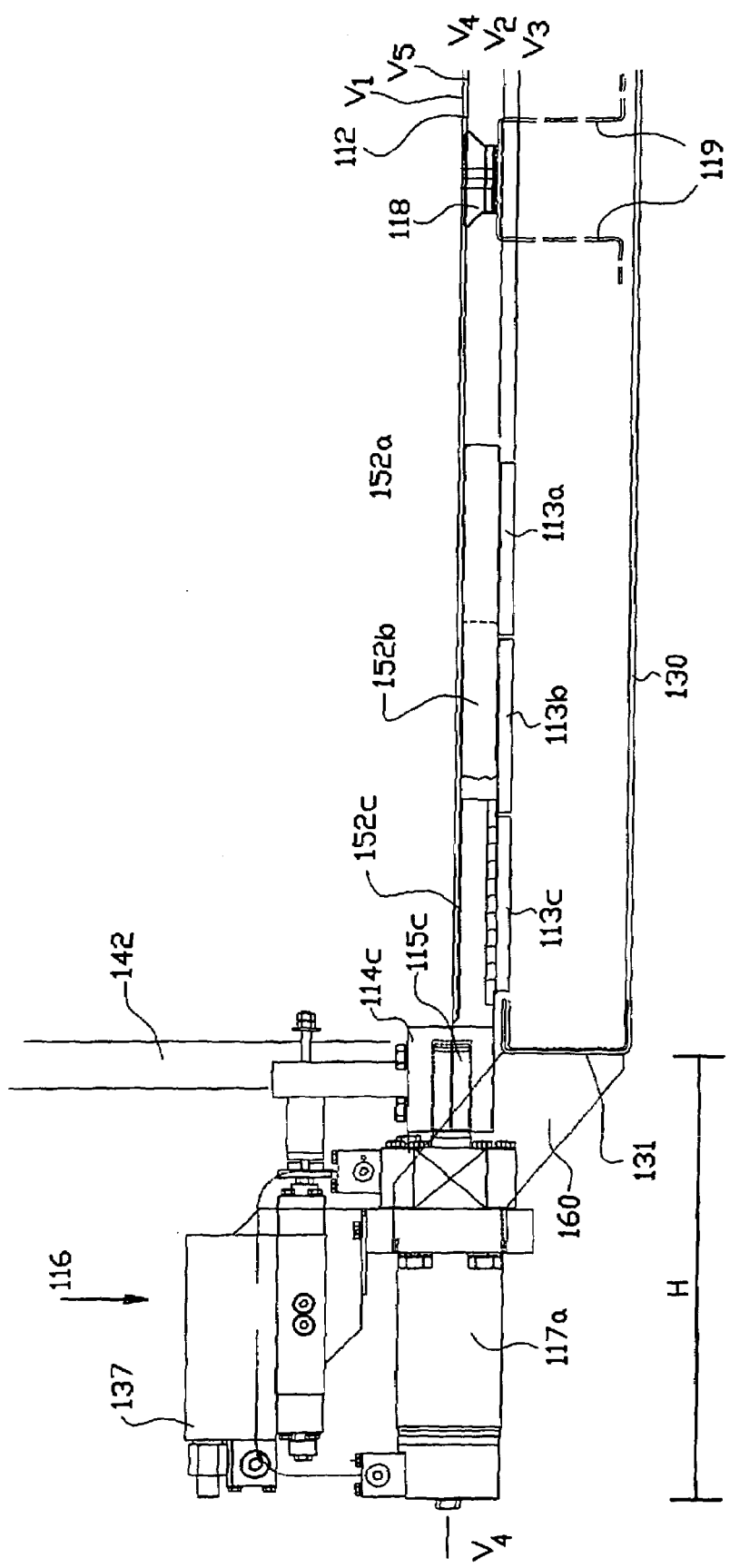
FIGS. 3A and 3B a schematic side view and a schematic rear view, respectively, of the drive section of the floor of the trailer according to FIGS. 1 and 3.
Figure 3B:
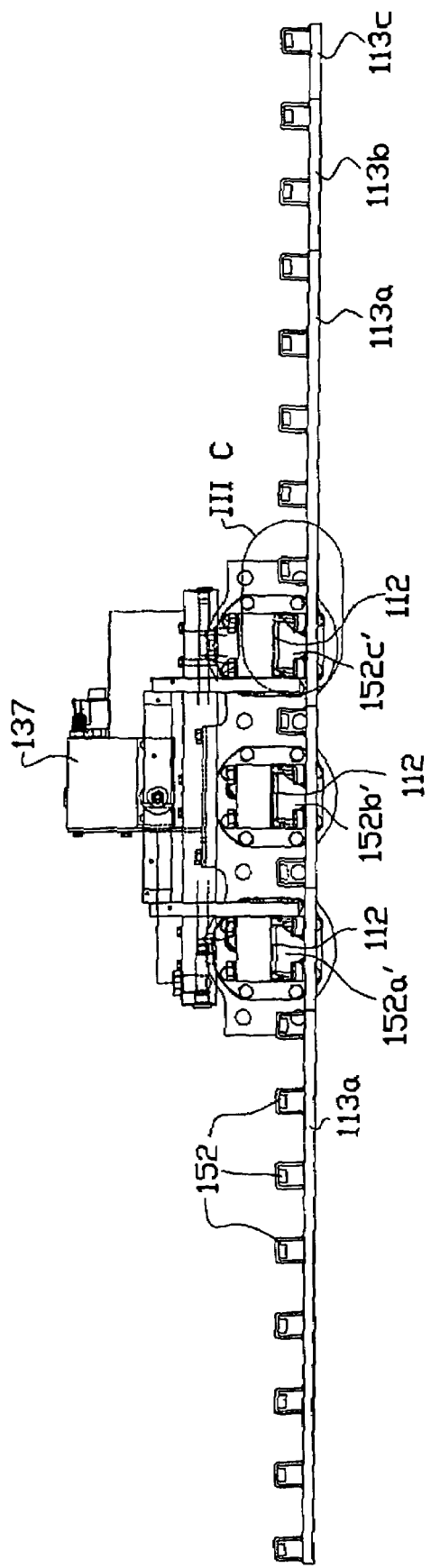

In FIGS. 3, 3A and 3B the two-part (shells) attachment clamps 114a-c are located in front of the front drive foot 113C. The lowest of the attachment clamps 114a-c is each time formed as a rigid unity with extended fingers 152a'-c', which as it were form an extension of the respective piston rods 115a-c. The extended fingers 152a'-c' are rigidly attached to the respective drive feet 113a-c and extend in forward direction therefrom that location. The slats 112 are attached to the drive feet through the short fingers 152a-c, but three slats 112 are attached directly to the extended fingers 152a'-c', which form an extension of the piston rods 117a-c. In a detail of FIG. 3C a cross-section of this connection has been illustrated. Both the attachment clamps 114a-c and the piston rods 115a-c are in a higher position than the upper side of each drive foot 113a-c, so that they can move across the other drive feet.

In the arrangement as illustrated here the cylinder housing 117a-c, which is rigidly attached to the cross beam 31 through brackets 160, extends along a small distance H in front of the front wall 142 of the cargo space 140. The space above the slats 112 is completely free in a vertical sense, and is available for cargo. Thus, in this embodiment the useful cargo surface is not restricted by the attachment clamps and the casing of FIGS. 2C, D is not necessary. The length of the attachment clamps 114a-c may be approximately the thickness of the front wall 142, said wall comprising suitable passages for the attachment clamps 114a-c. Again the piston rods 115a-c and the attachment clamps 114a-c are located at least partially within the profile of the slats 112.

Figure 3C:
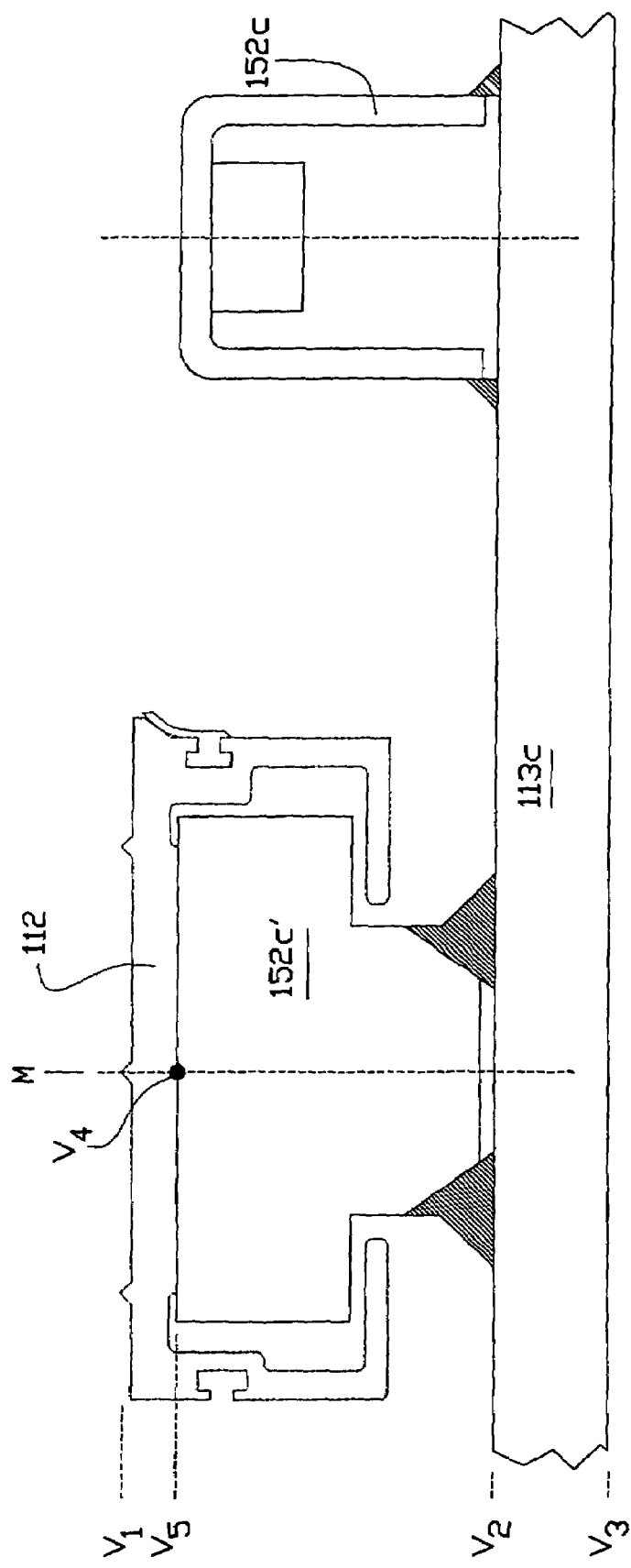
FIG. 3C a detail of a connection between slat-drive foot of FIG. 3B.

In the example of FIG. 3 and further on, the level of the support surface of the slats 12, V1, is illustrated, subsequently the opposite surface of the upper wall of the slats 12, V5, subsequently the upper surface of the drive feet 13a-c, V2, subsequently the lower surface of the drive feet V3, and the axis V4 of the piston rods 15a-c which coincides with V5, vide FIG. 3C.

It is to be noted that the fingers 152a-c are not purley consecutively alternately arranged, but that at the ends of the feet 113a and 113b at the one longitudinal edge of the floor and the ends of the ends of the feet 113c and 113b at the other longitudinal edge of the floor, the outermost finger 152b is located between two fingers 152a and fingers 152c, respectively. The extensions 152a'-c' are located in the centre of the accompanying drive feet 113a-c, wherein at each side thereof an equal number of fingers 152a-c is located.

It is further to be noted that in the top view of FIG. 3 the axes V4 of the piston rods are aligned again with the middle of the slat 112.

Figure 4:
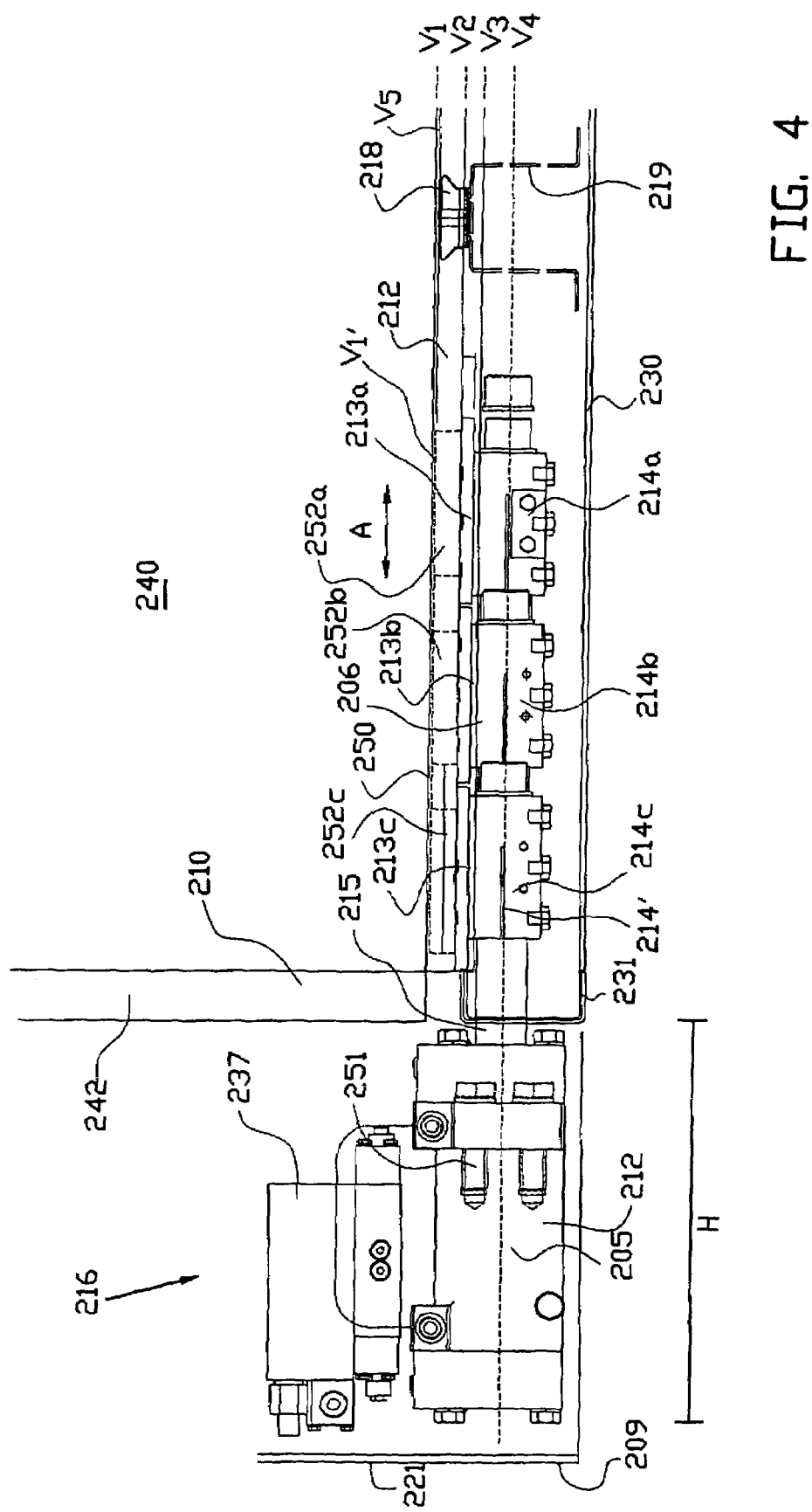
FIG. 4 a schematic side view of another alternative embodiment of the drive section of the floor of the trailer according to FIG. 1.

FIG. 4 illustrates an alternative arrangement, in which the slats 212 and the drive feet 213a-c are located at the same level as in FIGS. 2 and 3.

In the illustrated arrangement the cylinder housing 217 extends over a small distance H in front of the front wall 242 of the cargo space 240. The space above the slats 212 is completely free in a vertical sense, and is available for cargo. The piston rods 215a, b, c are located below the drive feet 213a-c, within the space which is already present for the chassis of the trailer 1. In this example the clamps 214a-c are formed as sleeves that are rigidly connected to the drive feet 213a-c, which at two oppisite sides are provided with slits 214'. In assembling, the sleeves permit the sliding insertion of the piston rods, after which the bolts shown can be tightened, so that the slits are reduced and the sleeve passage is reduced such that the piston rod is clamped.

In the example of FIG. 4 the level of the support surface of the slats 12, VI, is illustrated, subsequently the opposite surface of the upper wall of the slats 212, V5, subsequently the upper surface of the drive feet 213a-c, V2, subsequently the lower surface of the drive feet V3, and the central axis V4 of the piston rods 215a-c, located below it.

In principle it is possible to transfer the forces of the load, which are excerted on the front area of the floor of slats on the one hand through the drive feet 13a-b, 113a-c, 213a-c, to the piston rods 15a-c, 115a-c, 215a-c, and then to the cylinders 16a-c, 116a-c, 216a-c, and through the cylinders 16a-c, 116a-c, 216a-c, to the chassis, and on the other hand through the slats and the nearer transverse member (cross beam) of the chassis.

As a larger part of the floor at the front side of the cargo space is available for cargo, it may be necessary to provide an additional support for the drive feet and/or slats.

According to a first embodiment the drive feet 13a-c may be additionally supported, as illustrated in FIGS. 5 and 5A. It has been illustrated there that between the cross beams 31 and 19 for instance two box girders 36a, b can be provided. The upper side of the box girders 36a, b is coated with a synthetic layer 38a, b which guides the slats, and forms a slide bearing support, over which the drive feet 13a-c can be reciprocated in the direction A in a supported manner.

Figure 6:
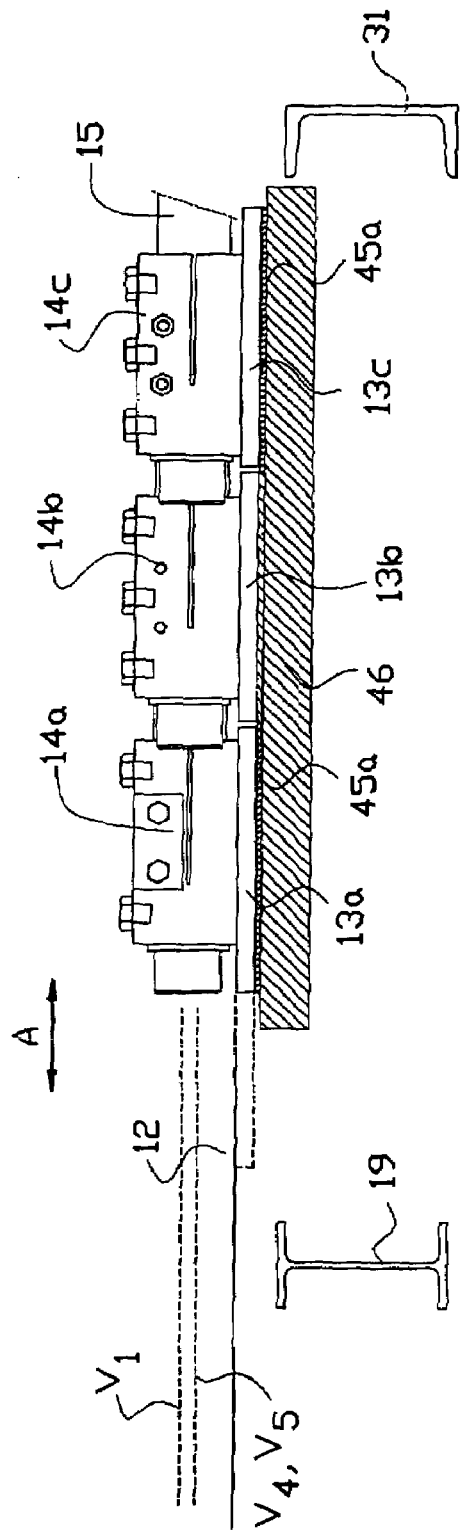
FIGS. 6 and 6A a schematic side view and an end view, respectively, of the drive unit corresponding with that of FIG. 2, with a second type of support for the drive feet.
Figure 6A:
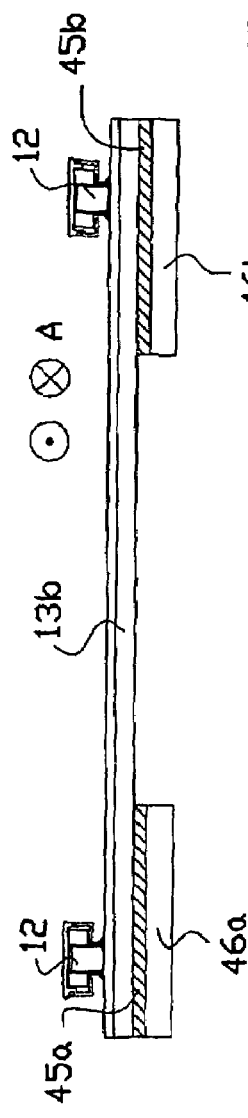

An alternative embodiment is illustrated in FIGS. 6, 6A according to which supports 46a, b are attached below the central drive foot 13b. The suppors 46a, b extend in forward and rearward direction to entirely below the drive feet 13a and 13c. At the front side and the rear side of the drive foot 13b the supports 46a, b are provided with a synthetic layer 45a, b for guidance, over which the drive feet 13 and 13c can be reciprocated in a supported manner.

Figure 7:
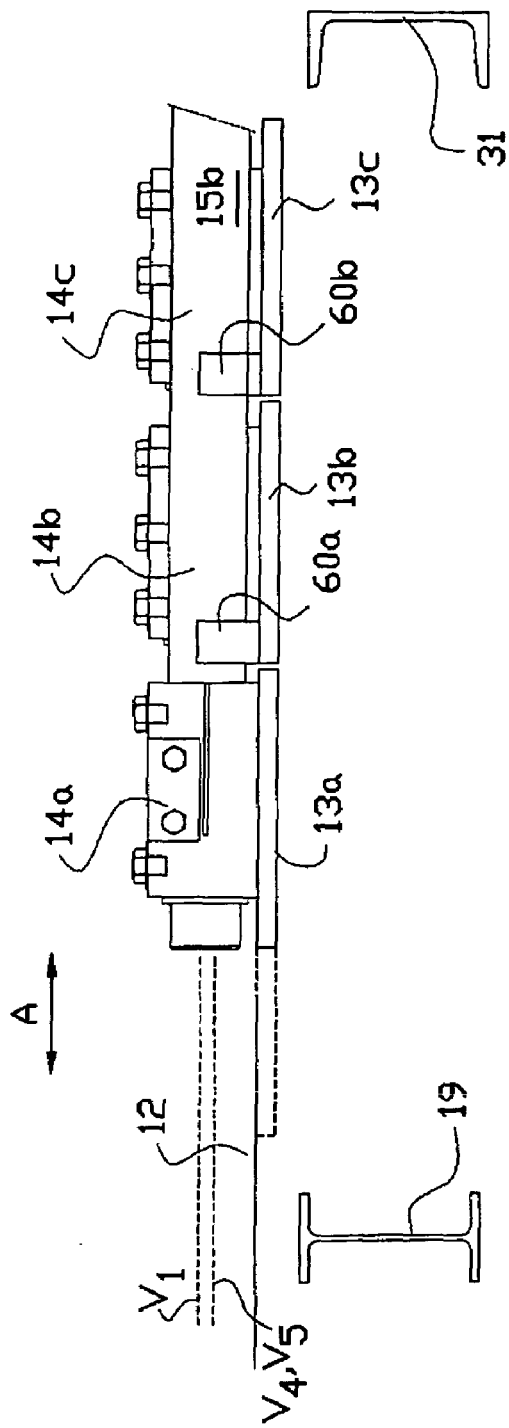
FIGS. 7 and 7A a schematic side view and an end view, respectively, of the drive unit corresponding with that of FIG. 2, with a third type of support for the drive feet.
Figure 7A:
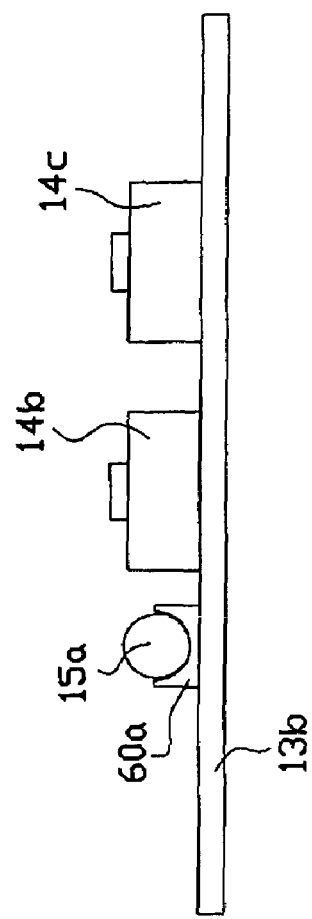

Another alternative is illustrated in FIGS. 7 and 7A, wherein the drive foot 13c comprises a support 60b, coated with synthetic material, in which the piston rod 15b is supported in a guiding manner. The piston rod 15a is guidingly supported in a support 60a, coated with synthetic material, which is fixedly attached to the central drive foot 13b. Thus the drive foot 13a is supported by drive foot 13b, and said drive foot is supported on drive foot 13c.

It should be noted that although in the given examples three groups of movable slats are concerned, other arrangements are possible within the scope of the invention, for instance an arrangement with two groups of movable slats and one group of fixed slats, in an alternate arrangement.

Furthermore it has to be noted that the invention is suitable for floors for displacing cargo in one or two opposite directions, such as loading and unloading.

Furthermore it should be noted that the floors according to the invention may also be used in stationary frames, on trucks and on trailers.

The invention claimed is:

1. Cargo supporting floor:
   wherein the floor comprises two or more groups of movable slats, which extend between a front side and a rear side of the floor, each group of movable slats being attached to a drive foot which is reciprocal in the slat direction by means of an accompanying drive cylinder assembly with a cylinder and piston rod, the drive cylinder assemblies being at least partially arranged in front of the groups of slats, and by means of the movable component of the respective drive cylinder assembly are each connected to an associated drive foot;
   wherein the slats are attached to the upper side of the drive foot;
   wherein the movable component is located at least partially below the upper surface of the slats; and
   wherein the movable component is located above the lower surface of the slats and/or above the upper surface of the drive feet.

2. Floor according to claim 1, wherein the movable component is located at least partially within the vertical space as defined by the slats.

3. Floor according to claim 2, wherein the movable component extends into one of the slats of a group.

4. Floor according to claim 3, wherein the movable component is connected to a drive foot and to a slat in a parallel manner.

5. Floor according to claim 3, wherein one of the slats of a group is directly connected to the associated movable component.

6. Floor according to claim 3, wherein by means of the movable component, the respective slat is connected to the associated drive foot.

7. Floor according to claim 3, wherein all slats extend up to the front end of the floor.

8. Floor according to claim 2, wherein the movable component extends into a vertical space which is left clear by local reduction in length of one or more slats.

9. Floor according to claim 8, wherein the slats located next to the space for movement of the movable components extend up to the end of the floor at that location.

10. Floor according to claim 8, wherein the space for movement of the movable components is shielded by a box or casing.

11. Floor according to claim 1, wherein the movable component is located below the upper surface of the slats.

12. Floor according to claim 11, wherein the movable component is located below the lower surface of the slats, and-or entirely below the drive feet.

13. Floor according to claim 11, wherein a first one of the drive feet also serves as direct or indirect support for another drive foot.

14. Floor according to claim 13, wherein the first one of the drive feet also serves as a direct or indirect support for more than one other drive foot.

15. Floor according to claim 13, wherein the first drive foot comprises support guides for one or more other drive feet or movable components which are connected thereto.

16. Floor according to claim 13, wherein the movable component is formed by a piston rod or an extension or continuation thereof, the cylinders being fixedly arranged.

17. Mobile cargo space, comprising a floor according to claim 13.

18. A cargo space according to claim 17, comprising a coupling for coupling with a truck, the drive cylinder assemblies being positioned at the front of the cargo space.

19. Cargo space according to claim 18, wherein the drive cylinders are positioned outside the cargo space, particularly when viewed in a horizontal plane.

20. Cargo space for dry cargo, with a floor which comprises two or more groups of movable slats, which extend between a front side and a rear side of the cargo space, each group of movable slats being attached to a drive foot which is reciprocal in the slat direction by means of an accompanying drive cylinder assembly with a cylinder and piston rod, the assemblies of drive cylinders being arranged at the front of the cargo space and by means of the movable component of the respective drive cylinder assembly are each connected to an associated drive foot, the slats being attached to the drive foot.

21. Cargo space for dry cargo, with a floor which comprises two or more groups of movable slats, which extend between a front side and a rear side of the cargo space, each group of movable slats being attached to a drive foot which is reciprocal in the slat direction by means of an accompanying drive cylinder assembly with a cylinder and piston rod, the assemblies of drive cylinders being arranged at the front of the cargo space and by means of the movable component of the respective drive cylinder assembly are each connected to an associated drive foot, the slats being attached to the drive foot, wherein the drive cylinders are positioned outside and in front of the cargo space.

22. Cargo supporting floor according to claim 1, wherein, of a set of three slats, the slats being, when considered in transverse direction consecutive, two slats are attached to a same drive foot and one to another drive foot, which preferably is located adjacent said first-mentioned drive foot.

23. Floor according to claim 22, wherein the set of three slats is arranged at the edge of the floor, wherein preferably such a set of three slats is arranged at both edges of the floor.

\* \* \* \* \*